No. 608,172. Patented Aug. 2, 1898.
D. M. BOTULINSKI.
BALE OR BOX HOOK.
(Application filed May 17, 1898.)
(No Model.)

WITNESSES
INVENTOR
Dmitro M. Botulinski
By his Att'y

UNITED STATES PATENT OFFICE.

DMITRO M. BOTULINSKI, OF BOSTON, MASSACHUSETTS.

BALE OR BOX HOOK.

SPECIFICATION forming part of Letters Patent No. 608,172, dated August 2, 1898.

Application filed May 17, 1898. Serial No. 680,921. (No model.)

*To all whom it may concern:*

Be it known that I, DMITRO M. BOTULINSKI, a subject of the Emperor of Austria-Hungary, residing at Boston, in the county of Suffolk and State of Massachusetts, have invented a new and useful Improvement in Bale or Box Hooks, of which the following is a specification.

This invention relates to that class of hooks which are used in handling boxes and cases of merchandise, bales of cotton, wool, or hay, meat, &c.; and the invention relates to the construction of the handle and the means of securing the shank of the hook thereto, whereby the connection is made rigid and strong, the hook prevented from becoming loose, the handle strengthened without dividing it transversely at the point of its connection with the shank of the hook, and the hook rendered easily removable in case it is desired to replace either the hook or the handle with another.

The nature of the invention is fully described in detail below and illustrated in the accompanying drawings, in which—

Figure 1:
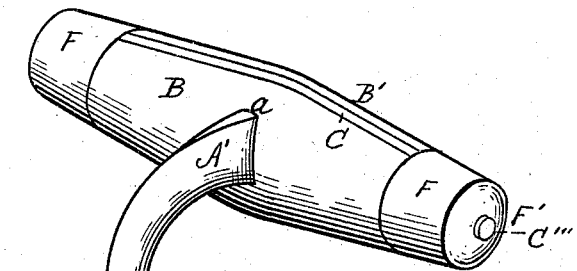
Figure 4:
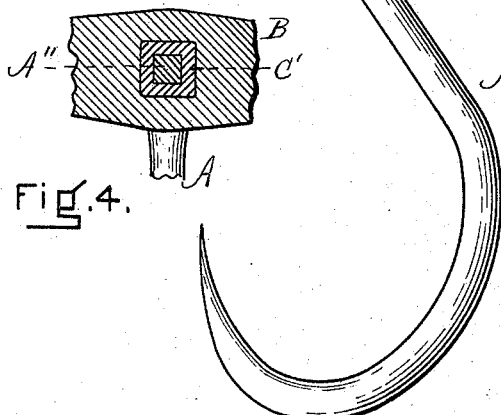
Figure 2:
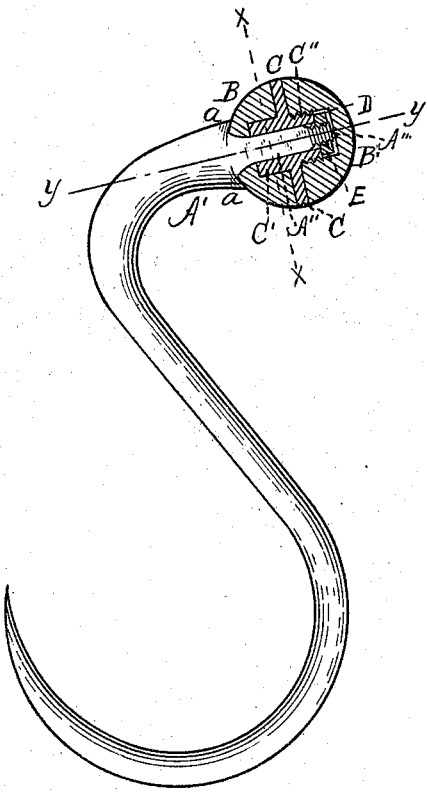
Figure 3:
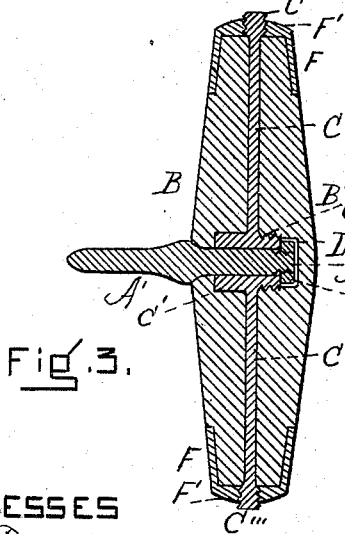

Figure 1 is a perspective view of my improved device. Fig. 2 is a transverse vertical section taken centrally through the handle, the hook being shown in elevation. Fig. 3 is a longitudinal section taken on line Y, Fig. 2. Fig. 4 is a sectional view taken on line X, Fig. 2, showing the connection between the portion B of the handle and the shank of the hook.

Similar letters of reference indicate corresponding parts.

A represents the hook proper, of which A' is the shank. The end of this shank is squared at A" and terminates in the screw-threaded portion A'''.

The handle is divided longitudinally into the two substantially equal parts B and B', made, preferably, of wood, and between these parts is laid the flat metallic plate C, which conforms in shape to the outer surface of said parts, as shown. This plate is provided with a central opening, through which the shank A" of the hook extends, and integral with the plate are two sockets or tubes C' and C''', extending from opposite sides thereof around said opening. The socket or tube C' is square or rectangular in shape in cross-section and extends forward from the plate into a correspondingly squared hole in the portion B of the handle and fits around the squared shank A". The socket or tube C''' is externally screw-threaded and extends from the plate into the correspondingly screw-threaded hole or recess D in the portion B' of the handle, said hole or recess being extended beyond its threaded portion, as shown in Figs. 2 and 3, to receive the nut E upon the screw-threaded end A'''' of the shank of the hook.

The opposite ends of the plate C are provided with the screw-threaded extensions C'''', which engage with correspondingly-threaded holes in the ends F of the sockets F'. These sockets are thus placed upon the opposite ends of the handle and serve to prevent any relative movement or rotation of the two parts B B' thereof.

To separate the hook and handle, the sockets F F' are unscrewed from the ends C'''' of the plate and removed from the handle, the portion B' of the handle is rotated with relation to the portion B and plate C, and thus unscrewed and removed from the screw-threaded socket or tube C''', the nut E is removed from the screw-threaded end of the shank of the hook, and said shank is then withdrawn through the socket or tube C' from the portion B of the handle. To unite the parts, the above process is reversed. When the parts are thus united, the hook is prevented from turning with relation to the handle by the squared shank A", which fits within the socket or tube C'. The latter is prevented from turning within the handle by means of the correspondingly-squared opening in the portion B, within which it fits. The shank of the hook is prevented from longitudinal movement in the handle by the nut E and the shoulders a on the shank of the hook and bearing against the handle. The two parts of the handle are united by means of the externally-screw-threaded socket or tube C''', and the two parts B and B' are prevented from relative rotation by the sockets F F'.

Having thus fully described my invention, what I claim, and desire to secure by Letters Patent, is—

1. In a hook of the character described for handling merchandise, the handle longitudinally divided into two parts B, B'; a plate placed between said parts and separating the same for substantially their entire length; a hook whose shank extends through one of the said parts of the handle and through the plate and whose inner end is secured within the other part of the handle beyond the plate; and means for connecting the two said parts of the handle and thereby preventing relative rotation of said parts, substantially as described.

2. In a hook of the character described for handling merchandise, the handle longitudinally divided into the two parts B, B'; the plate C placed longitudinally between and separating the said parts of the handle and provided with the interiorly-non-circular socket C' extending into the part B and with the externally-screw-threaded socket or tube C'' extending into and engaging with the part B'; the hook provided with a shank whose portion A'' fits into and corresponds in shape with said socket C' and whose extreme inner end extends through said socket C'' and is adapted to be secured within the part B' beyond the socket C''; and means for preventing the relative movement of the two said parts of the handle, substantially as set forth.

3. In a hook of the character described for handling merchandise, the handle longitudinally divided into the two parts B, B'; the plate C placed longitudinally between and separating the said parts of the handle and provided with the interiorly-non-circular socket C' extending into the part B and with the externally-screw-threaded socket or tube C'' extending into and engaging with the part B'; the hook provided with a shank whose portion A'' fits into and corresponds in shape with said socket C' and whose extreme inner end extends through said socket C'' and is adapted to be secured within the part B' beyond the socket C''; the externally-screw-threaded extensions C''' formed on the opposite ends of the plate C; and the sockets F, F' adapted to be screwed upon said extensions and fit over the opposite ends of the handle and thereby prevent relative rotation of the parts B, B' thereof, substantially as described.

DMITRO M. BOTULINSKI.

Witnesses:
HENRY W. WILLIAMS,
A. N. BONNEY.